United States Patent [19]
George et al.

[11] 3,857,172
[45] Dec. 31, 1974

[54] APPARATUS AND METHOD FOR WINDING ARMATURES

[75] Inventors: Robert D. George, Waynesville; Alvin C. Banner, Kettering; George W. Morrison, Dayton, all of Ohio

[73] Assignee: Mechaneer, Inc., Dayton, Ohio

[22] Filed: Mar. 27, 1972

[21] Appl. No.: 238,246

[52] U.S. Cl............. 29/597, 29/205 C, 29/205 CM, 29/598, 242/7.03, 242/7.05 R, 242/7.05 B
[51] Int. Cl............................................. H01r 43/00
[58] Field of Search...... 29/597, 598, 205 R, 205 L, 29/205 LM; 242/7.03, 7.05 R, 7.05 B, 7.05 C

[56] References Cited
UNITED STATES PATENTS

| | | | |
|---|---|---|---|
| 2,718,359 | 9/1955 | Hunsdorf | 242/7.05 C |
| 3,142,890 | 8/1964 | Adams et al. | 29/598 |
| 3,585,716 | 6/1971 | Steinke | 29/597 |
| 3,628,229 | 12/1971 | Biddison et al. | 29/205 C |
| 3,713,209 | 1/1973 | Biddison | 29/597 |

Primary Examiner—C. W. Lanham
Assistant Examiner—Carl E. Hall
Attorney, Agent, or Firm—Jacox & Meckstroth

[57] ABSTRACT

An armature including a shaft which supports an armature core and a commutator having wire lead connecting tangs, is loaded into a double flier-type armature winding machine by an axially movable commutator shield assembly. The shield assembly includes an inner sleeve which shields the tangs, and an outer sleeve is mounted on the inner sleeve for axial movement to expose each tang for attaching the corresponding wire lead. Complimentary wire shearing surfaces are formed on the outer ends of the inner and outer sleeves, and the outer sleeve is rotated on the inner sleeve to effect shearing of the end wire leads adjacent the corresponding tangs. A set of upper and lower wire gripping fingers are pivotally supported by an axially movable carriage and cooperate with the sleeves and the rotary winding fliers to provide for automatic cutting of the start and final wire leads in addition to automatic winding of the core at the winding station.

15 Claims, 8 Drawing Figures

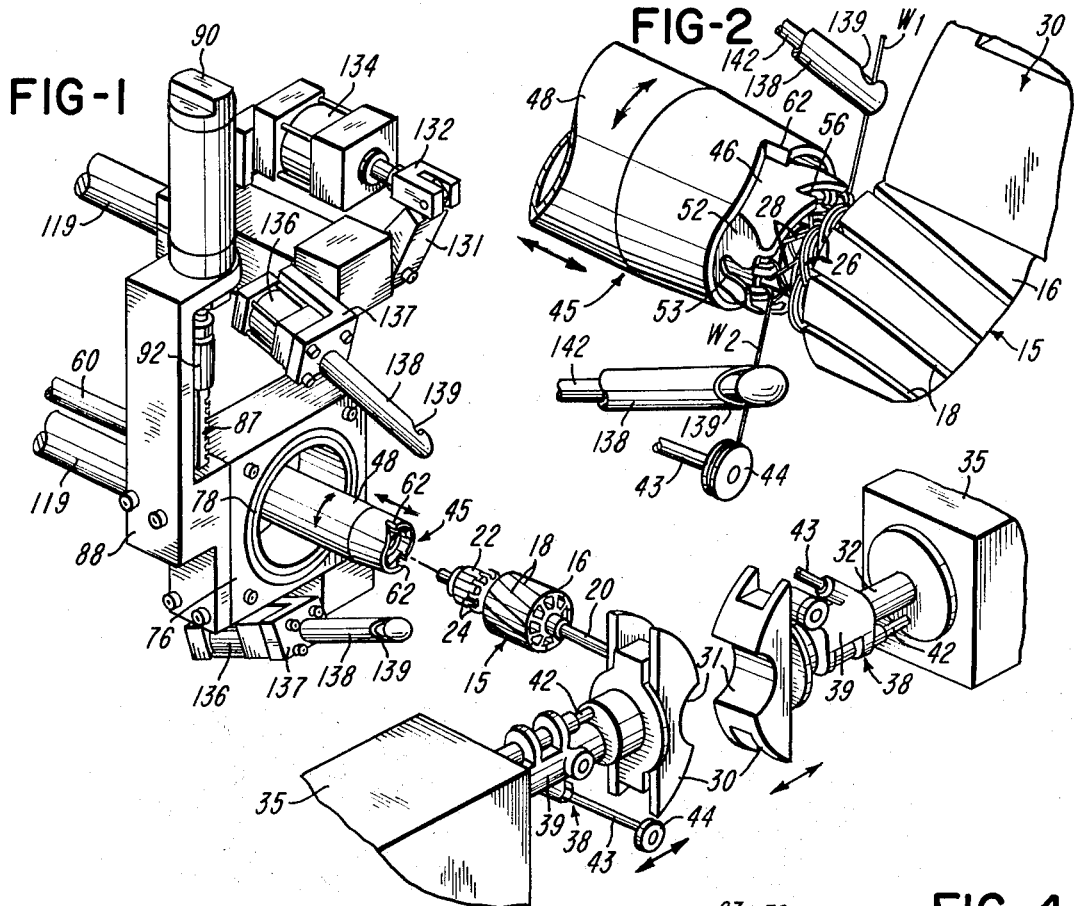
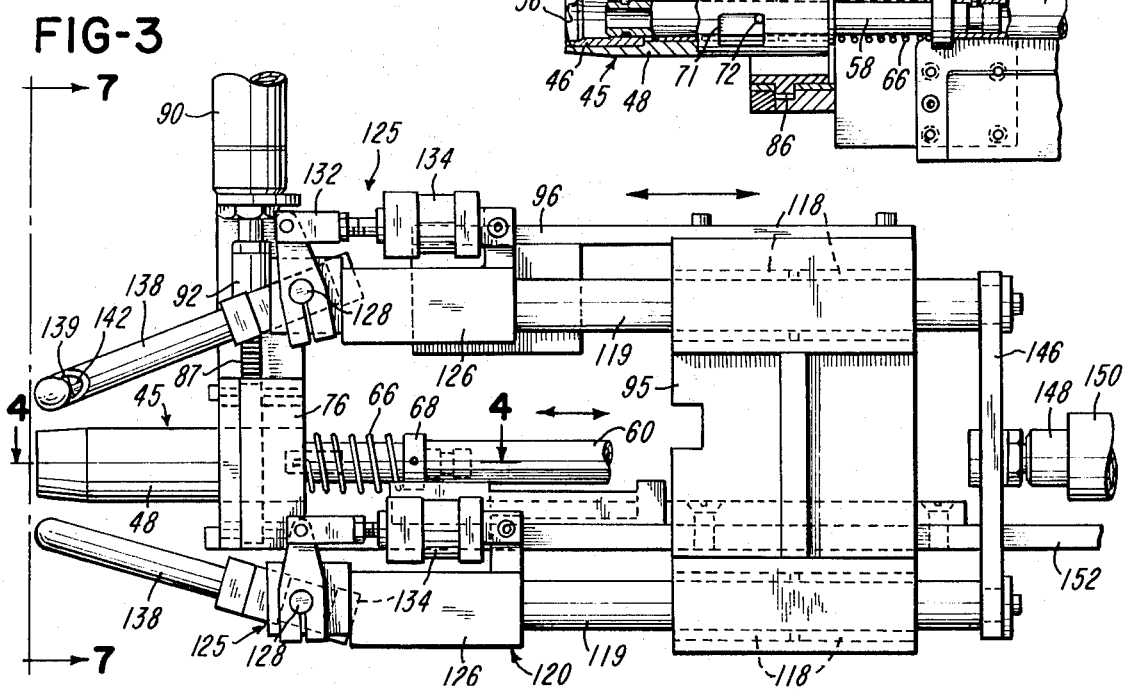

PATENTED DEC 31 1974
3,857,172
SHEET 2 OF 2
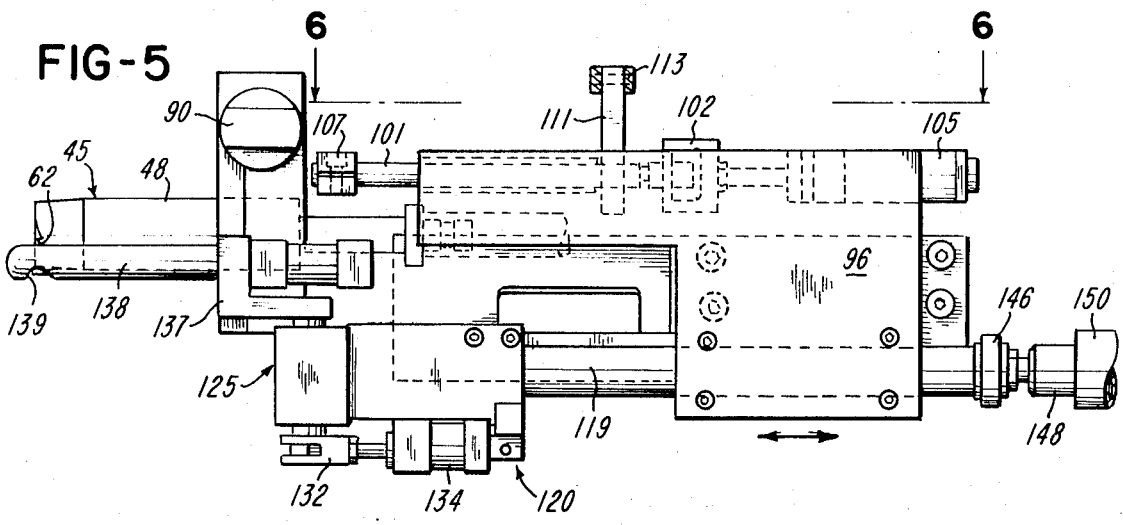
FIG-5
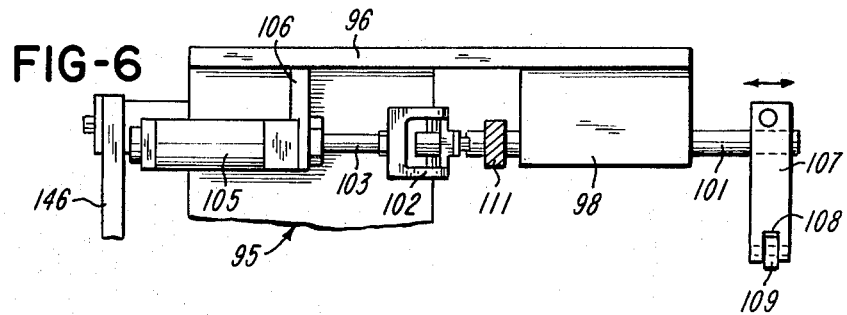
FIG-6
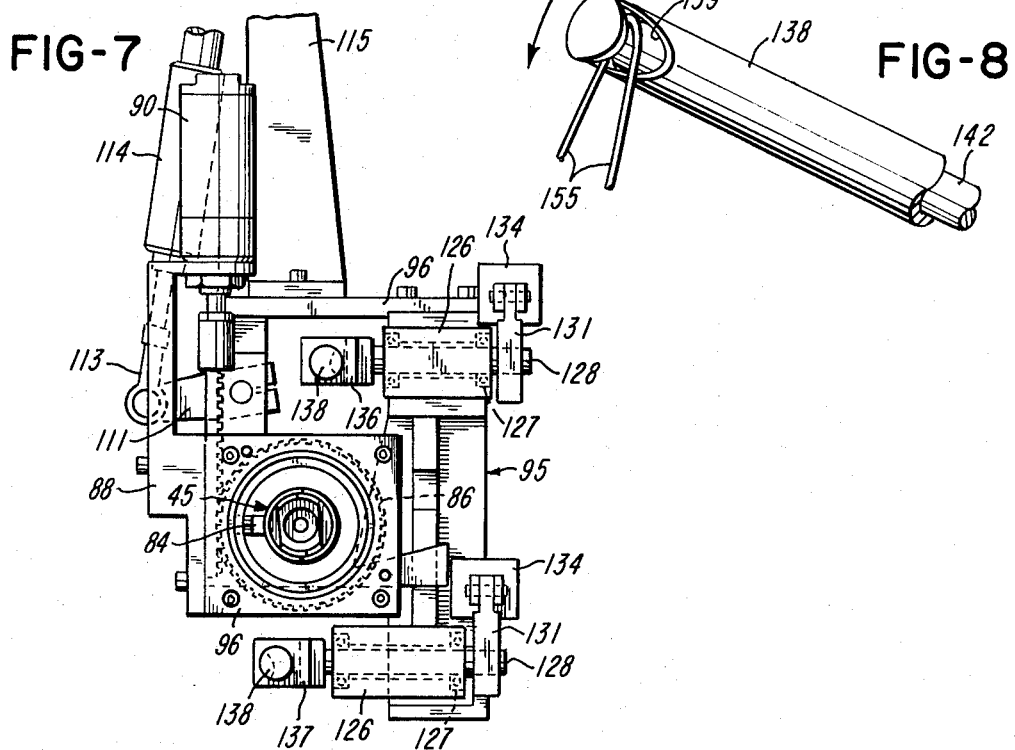
FIG-7
FIG-8

APPARATUS AND METHOD FOR WINDING ARMATURES

BACKGROUND OF THE INVENTION

This invention relates to an armature winding machine of the general type disclosed in U.S. Pat. Nos. 2,267,379, and 3,013,737, and wherein coils of wire are wound on a slotted armature core mounted on a shaft. The shaft also supports a commutator having tangs or other means for connecting wire leads extending from the coils to corresponding segments of the commutator. After each armature is wound, the armature is removed from the winding machine, and the start and final wire leads are manually cut while the next armature is loaded into the machine for winding. As a result of this method of removing the start and final wire leads extending from a wound armature, it has been found that approximately 30 inches of wire is lost as scrap with the winding of each armature.

There have been various devices constructed or proposed for cutting the wire leads before the wound armature is removed from the winding machine in order to reduce the length of wire which is scrapped and to eliminate the manual cutting operation. For example, U.S. Pat. No. 3,585,716 discloses a scissors-like shearing mechanism which moves radially to a shearing position adjacent the commutator after the wound armature is shifted axially from the winding station to a lead cut-off station. While this mechanism eliminates the manual cutting operation, a substantial length of wire extending from the first set of wire connected commutator tangs, results as scrap. Furthermore, the wire shearing mechanism requires substantial space in line with the coil winding mechanism and interferes with efficient unloading and transfer of each armature after it is wound. It has also been proposed to incorporate a wire lead cut-off mechanism which mounts on a pivotal arm and swings into a cut-off position adjacent the armature after it is wound. However, the complex construction of such a mechanism does not provide for dependable automatic operation of the winding machine.

SUMMARY OF THE INVENTION

The present invention is directed to an armature winding apparatus which incorporates an improved means for automatically cutting the end wire leads immediately adjacent the connectors or tangs of the commutator and for minimizing the wire scrap resulting from the winding of each armature. The wire lead cut-off mechanism of the invention is also durable and economical in construction and provides for dependable automatic operation so that one operator can conveniently operate several armature winding machines and thereby significantly reduce the cost of winding the armatures. The wire lead cut-off mechanism of the invention also provides for convenient and rapid automatic loading and unloading of armatures into the winding machine and assures precise connection of the wire leads of each coil to the corresponding segments of the commutator.

In accordance with a preferred embodiment of the invention, the armature winding apparatus incorporates a shield assembly including an inner sleeve which receives and surrounds the commutator of each armature. The inner sleeve has a set of diametrically opposed slots for exposing each set of commutator tangs for attaching the corresponding wire leads. An outer sleeve is mounted on the inner sleeve for both rotary and axial movement and is retracted axially for attaching each wire lead to a commutator tang.

Diametrically opposed notches are formed within the outer end portion of the outer sleeve to form axially extending shear surfaces, and corresponding notches are formed in the outer end portion of the inner sleeve to form opposing shear surfaces. When it is desired to shear the end wire leads adjacent the corresponding tang, the wire leads are located between the corresponding shear surfaces, and the outer sleeve is rotated to effect shearing of the wire leads. The wire lead cut-off mechanism of the invention also incorporates a set of finger-like gripping members which are pivotally supported by a carriage supported for axial movement relative to the inner and outer sleeves in response to actuation of a three positioned fluid cylinder. Each gripping member is pivoted by a corresponding fluid cylinder and includes a gripping element which is actuated by a fluid cylinder. The gripping members cooperate with the rotary fliers and the inner and outer commutator sleeves to effect gripping of the wires before the leads are cut and to provide for automatic starting of the winding of the next successive armature with the minimum of wire scrap.

Other features and acvantages of the invention will be apparent from the following description, the accompanying drawings and the appended claims.

BRIEF DESCRIPTION OF THE DRAWINGS

FIG. 1 is an exploded fragmentary perspective view of armature winding apparatus incorporating a wire lead cut-off mechanism constructed in accordance with the invention;

FIG. 2 is an enlarged fragmentary perspective view of the commutator shield assembly shown in FIG. 1 and illustrating one of its positions during winding of an armature;

FIG. 3 is an elevational view of the wire lead cut-off mechanism shown in FIG. 1;

FIG. 4 is a fragmentary axial section taken generally on the line 4—4 of FIG. 3.

FIG. 5 is a plan view of the wire lead cut-off mechanism shown in FIG. 3;

FIG. 6 is a fragmentary section taken generally on the line 6—6 of FIG. 5;

FIG. 7 is an elevational end view of the wire lead cut-off mechanism as taken generally on the line 7—7 of FIG. 3; and FIG. 8 is a fragmentary perspective view of a wire gripping member and illustrating the short length of wire which results as scrap after the winding of each armature.

DESCRIPTION OF THE PREFERRED EMBODIMENT

Referring to FIG. 1, the apparatus of the invention is ideally suited for winding an armature 15 consisting of a laminated core 16 having peripherally spaced slots 18 and rigidly secured to a shaft 20. A commutator 22 is mounted on the shaft 20 and incorporates a series of peripherally spaced commutator segments each having a hook-like tang 24 projecting inwardly and outwardly adjacent the core 16. As illustrated in the above mentioned patents, the slots 18 receive corresponding wire coils 26 (FIG. 2) which are formed by simultaneously winding a set of wires W1 and W2 in opposite directions. The coils 26 have wire leads 28 which loop around the tangs 24, and the tangs 24 are subsequently hot staked to the wire leads 28 to form electrical connections between the wire leads and the corresponding segments of the commutator 22.

The winding of the wire coils 26 is performed while the armature core 18 is retained by a pair of opposing wire forming chucks 30 each having a semicylindrical cavity 31 conforming to the curvature of the armature core 18. Each of the chucks 30 is supported by an antifriction bearing (not shown) mounted on the outer end portion of a corresponding tubular spindle 32 through which the wire is fed, and each of the spindles 32 is supported for rotary and axial movement by a corresponding housing portion 35. Each spindle 32 is moved axially by a lever (not shown) activated by a fluid cylinder, and the spindles are driven by a reversible hydrostatic drive (not shown) enclosed within the housing.

A flier assembly 38 is rigidly secured to each of the spindles 32 for rotation therewith and includes a hub portion 39 which supports a wire guide roller or pulley (not shown) and a telescopic spring-bias brake rod assembly 42. A flier arm 43 projects outwardly from each of the hub members 39 and supports another wire guide roller or pulley 44. During the winding of an armature 15 while it is supported by the chucks 30 as illustrated in FIG. 2, the flier assemblies 38 and the corresponding spindles 32 rotate in opposite directions. Also during the winding operation, the commutator 22 of the armature is confined within a shield assembly 45 including a cylindrical non-rotative inner sleeve 46 surrounded by an outer cylindrical sleeve 48.

Referring to FIGS. 2 and 4, the inner sleeve 46 includes diametrically opposed recesses or depressions 52 each having a slot 53 for exposing a tang 24 when the outer shield 48 is retracted as illustrated in FIG. 2. The inner shield 46 also has a pair of diametrically opposed wire shearing edges 46 which extend axially and are formed by V-shaped notches within the forward edge surface of the inner sleeve 46. As shown in FIG. 4, the inner sleeve 46 is secured to the forward end portion of a rod 58 projecting from the forward end portion of a rod 60 extending from an elongated air cylinder (not shown) which provides for retracting the shield assembly 45 as will be explained later.

The outer tubular shield or sleeve 48 also has a pair of diametrically opposed wire shearing surfaces 62 which extend axially and are formed by V-shaped notches in the forward end portion of the outer sleeve 48. As will be explained later, the shearing surfaces 56 on the inner sleeve 46 cooperate with the corresponding shearing surfaces 62 on the outer sleeve 48 to shear the wires W1 and W2 when the outer sleeve 48 is rotated.

As shown in FIG. 4, a torsion coil spring 66 has a forward end portion which projects into an axially extending hole within the rear surface of the outer sleeve 48, and a rearward end portion which projects to an axially extending hole formed within a collar 68 rigidly secured to the rod 58. A rectangular opening 71 is formed within the outer sleeve 48 and receives a pin 72 projecting radially outwardly from the rod 58. The torsion coil spring 66 normally biases the outer sleeve 48 forwardly and torsionally so that the pin 72 is normally located within a rear corner of the opening 71 as illustrated in FIG. 4.

A stationary rectangular block 76 (FIG. 1) rotatably supports a cylindrical sleeve 78 in a position concentrically surrounding the shield assembly 45. The sleeve 78 has a notch 79 (FIG. 4) within its rearward edge surface for slidably receiving a projection 82 forming part of an actuating member 84 which is rigidly secured to the rearward end portion of the outer sleeve 48. A ring gear 86 extends around the sleeve 78 and is engaged by a rack 87 (FIG. 1) supported for vertical sliding movement within a bracket 88 which is secured to the one side of the block 76. The vertically disposed fluid cylinder 90 is supported by the bracket 88 and has a piston rod connected to the upper end portion of the rack 87 by a coupling 92. When the fluid cylinder 90 is actuated to lower the rack 87, the outer tubular shield 48 is rotated on the inner shield 46 as indicated by the arrows in FIGS. 1 and 2.

A fabricated frame 95 (FIGS. 3, 5, 6 and 7) is rigidly secured to the main housing of the armature winding machine and includes a horizontal top plate 96 which supports a depending bearing block 98 (FIG. 6). A shaft 101 is supported for both rotary and axially sliding movement by the bearing block 98 and is connected by a rotary coupling 102 to the piston rod 103 of a fluid cylinder 105 supported by bracket 106 depending from the frame plate 96. An arm 107 is mounted on the forward end portion of the rod 101 and has a slot 108 which is adapted to receive a projection 109 (FIG. 4) forming part of the actuator 84 secured to the outer sleeve 48.

A lever 111 (FIGS. 5 and 6) is rigidly secured to the rod 101 and projects outwardly as shown in FIG. 7. The outer end portion of the lever 111 is pivotally connected by fitting 113 to the piston rod of a fluid cylinder 114 having an upper end portion pivotally supported by a bracket 115 (FIG. 7) projecting upwardly from the frame plate 96. Actuation of the cylinder 105 to retract the piston rod 103, is effective to retract the outer sleeve 48 on the inner sleeve 46 (FIG. 2) of the shield assembly 45, and actuation of the cylinder 114 is effective to pivot the arm 107 out of engagement with the actuator member 84 on the outer sleeve 48 so that the entire shield assembly 45 is free to be retracted from the surrounding block 76 with the rod 60.

A set of upper and lower bearings 118 (FIG. 3) are rigidly supported by the frame 95, and each bearing 118 slidably supports a rod 119 forming part of a carriage 120. The carriage 120 also includes a set of upper and lower wire gripping assemblies 125 which are secured to the forward end portions of the rods 119 for axial movement with the rods. Each of the gripping assemblies 125 includes a support block 126 having a bore which receives the corresponding rod 119 and which confines a set of antifriction bearings 127 (FIG. 7) for supporting a cross shaft 128. A lever 131 is secured to the outer end portion of each shaft 128 and is pivotally connected by a fitting 132 to the piston rod of a corresponding fluid cylinder 134 supported by the block 126.

Another fluid cylinder 136 is supported by an L-shaped bracket 137 secured to the inner portion of each shaft 128 and supporting a tubular gripping member or finger 138 having a diagonally extending notch or recess 139 formed within its outer end portion. A gripping element or rod 142 is slidably supported within each of the gripping members or fingers 138 and is shifted axially in response to actuation of the corresponding fluid cylinder 136 to provide for gripping and releasing the corresponding wire W1 or W2. Actuation of the cylinders 134 is effective to pivot the gripping fingers 138 between inwardly converging positions (FIG. 3) and generally parallel positions (FIG. 7).

The rearward end portions of the support rods 119 are rigidly secured by a bar 146 having a center portion secured to the forward piston rod 148 of a dual piston fluid cylinder 150. The rear piston rod (not shown) projecting from the opposite end of the cylinder 150, is rigidly secured to a bracket 152 forming part of the frame 95. Actuation of the dual piston fluid cylinder 150 is effective to locate the wire gripping heads or assemblies 125 in three positions including an intermediate position as shown in FIG. 3, a forward position where the gripping fingers 138 project in front of the shield assembly 45 between the armature core gripping chucks 130, and a fully retracted position (not shown) where the forward ends of the gripping fingers 138 are approximately flush with the front surface of the stationary support block 76.

The operation of the wire lead cut-off mechanism is completely automatic and is synchronized with the rotation of the flier assemblies 38, the movement of the chucks 30 and the indexing of each armature 15 during the winding operation. At the commencement of a winding cycle, the ends of the wires W1 and W2 extending around the flier pulleys 44, are clamped or gripped within the slots 139 formed within the end portions of the gripping fingers 138 by extension of the corresponding gripping elements 142. The gripping fingers 138 are moved to their extreme forward position by actuation of the cylinder 150, and the forming chucks 30 are retracted to their open position as shown in FIG. 1.

The shield assembly 45 is retracted to a position where an unwound armature is released from a ramp so that the armature rolls down to a position axially aligned with the shield assembly 45. The rod 60 and shield assembly 45 are then advanced or extended so that the commutator 22 and the corresponding end portion of the shaft 20 are received within the shield assembly 45, and the armature is carried by the shield assemmbly 45 to a winding position located between the forming chucks 30.

The forming chucks 30 are closed and the flier assemblies 38 rotate to lead pick-up positions, after which the outer shield 48 is retracted by actuation of the fluid cylinder 105. The flier assemblies 38 are then reversed by approximately 140° so that the wires W1 and W2 pick up the first set of commutator tangs 24 exposed by the slots 53. The outer shield 48 is extended to cover the exposed tangs 24, and then the gripping assemblies 125 are retracted to their intermediate positions (FIG. 3) by operation of the dual cylinder 150.

After the first set of coils 26 are wound, the armature 15 is indexed to present the second set of tangs 24 for exposure through the slots 53, and the outer shield 48 is again retracted to permit the wires W1 and W2 to hook the exposed tangs 24. The winding operations are repeated, and the armature 15 is indexed until the first set of engaged tangs 24 are located at the top and bottom of the shield assembly 45 where the leading end portions of the wires W1 and W2 extend from the first set of tangs 24 to the corresponding gripping fingers 138 and between the corresponding edge shearing surfaces 56 and 62 on the inner and outer sleeves 46 and 48, respectively. The outer sleeve 48 is rotated against the bias of the spring 66 by actuation of the fluid cylinder 90, as explained above, and the leading end portions of the wires W1 and W2 are sheared or severed immediately adjacent the first set of tangs 24.

During the shearing operation, the cylinders 134 are pressurized so that the gripping fingers 138 are urged radially outwardly to effect a tension within the leading end portions of the wires W1 and W2 as the armature 15 indexes to present the first set of tangs 24 to cutting positions at the top and bottom of the shield assembly 45. When the wire leads are severed, the gripping fingers 138 move outwardly to a generally parallel relation as shown in FIG. 7. The gripping assemblies 125 are then fully retracted by actuation of the dual cylinder 150, and the winding of the remaining coils 26 is completed. When the gripping assemblies 125 are retracted, the gripping elements 142 are retracted to release the short leading ends of the wires.

After the last coil 26 is wound, and the flier assemblies 38 stop, and the gripping fingers 138 are extended to their intermediate positions by actuation of the cylinder 150, with the wire gripping elements 142 remaining retracted. The outer sleeve 48 is then retracted, and the flier assemblies 38 are reversed approximately 140° so that the wires W1 and W2 are brought into hooking engagement with the last set of tangs 24. The outer sleeve 48 is then extended, and the armature 15 is indexed to rotate the last set of tangs to the cut-off positions located at the top and bottom of the shield assembly 45. During this indexing operation, the wires W1 and W2 are laid into the slots 139 of the gripping fingers 138 and simultaneously, the wires W1 and W2 are pulled into the slots defined between the corresponding shearing surfaces 56 and 62 on the inner and outer sleeves. The outer sleeve 48 is rotated again so that the end leads are sheared adjacent the final set of tangs 24 thereby completing the winding of the armature.

A wound armature 15 is automatically unloaded by an unloading device (not shown) after the forming chucks 30 are opened, and the shield assembly 45 and support rod 60 are retracted for receiving the next unwound armature. The cycle is then repeated. When the gripping assemblies 125 are again fully retracted, a short U-shaped piece 155 of wire (FIG. 8) is carried by each gripping finger 138 to the retracted position. These two pieces 155 of wire are the only pieces which are scrapped after the winding of each armature, and usually each piece has a length no greater than two to three inches. When the gripping aseemblies 125 are fully retracted, the gripping rods or elements 142 are retracted by actuation of the cylinders 134 so that the pieces 155 of wire drop to a scrap collecting pan located below the retracted gripping assemblies 125.

From the drawings and the above description, it is apparent that an armature winding machine incorporating a lead cut-off mechanism constructed in accordance with the present invention, provides desirable features and advantages. For example, the inner and outer sleeves 46 and 48 of the shield assembly 45 are not only effective to shear off the end leads immediately adjacent the corresponding tangs 24, but the inner sleeve 46 is also effective to wipe or fold the short stub end portion of the lead downwardly adjacent the tang when the armature 15 is indexed within the forming chucks 30. Furthermore, the support and movement of the gripping fingers 138 provide for minimizing the lengths of the pieces 155 of wire which are scrapped after the winding of each armature is completed and also serve to maintain a tension within each of the wires W1 and W2 prior to the cut-off operation.

In addition, the movement of the gripping members 138 to their fully retracted position, provides for automatically discharging the scrap pieces 155 of wire simply by retracting the gripping elements 142 and allowing the wire pieces 155 to drop into a suitable container. This eliminates the possibility of the scrap pieces 155 of wire being caught within the forming chucks 30 and interfering with the winding of the next armature.

It has also been found that the operation of the outer sleeve 48 of the shield assembly 45 and the operation of the gripping members or fingers 138 are highly dependable and provide for the entire cut-off operation to be completely automatic. Thus when a wound armature is unloaded from the forming chucks 30 in a direction away from the commutator shield assembly 45, the wound armature is completed and requires no further manual operation for trimming or depressing the start and final wire leads.

While the form of armature winding apparatus herein described constitutes a preferred embodiment of the invention, it is to be understood that the invention is not limited to this precise form of apparatus, and that changes may be made therein without departing from the scope and spirit of the invention.

The invention having thus been described, the following is claimed:

1. In apparatus for winding coils of wire on an armature core mounted on a shaft supporting a commutator having tangs to which armature wire leads are attached to the commutator, the combination of an inner sleeve surrounding the commutator to shield the tangs, an outer sleeve surrounding said inner sleeve, at least one wire shearing surface on said inner sleeve, at least one wire shearing surface on said outer sleeve, said sleeves being rotatable between a first position where a wire lead extends from a commutator tang between said first and second shearing surfaces and a second position to effect shearing of the wire lead by said first and second shearing surfaces, and power operated means for producing relative rotative movement of said sleeves between said first and second positions.

2. Apparatus as defined in claim 1 including a set of wire gripping members positioned generally radially outwardly of said outer sleeve, each said gripping member having means for releasably gripping a wire lead, means supporting said gripping members for movement in a generally radial direction relative to said sleeves, and power operated means for moving said gripping members in said direction to aid in positioning the wire leads between said shearing surfaces and in attaching the wire leads to the corresponding tangs of said commutator.

3. Apparatus as defined in claim 2 wherein said means supporting said gripping members, comprise a carriage supported for axial movement relative to said sleeves, and power operated means for moving said carriage.

4. Apparatus as defined in claim 3 wherein said carriage and said gripping members are movable axially between a forward extended position for attaching wire leads to said tangs and a retracted position after the wire leads are sheared and through an intermediate position effective to assist gripping of the wire leads.

5. Apparatus as defined in claim 2 wherein each said gripping member includes a tubular finger, a gripping element slidably mounted within said finger, means defining a slot within said finger for receiving a wire lead, and power operated means for moving said gripping element within said finger to effect gripping and releasing of the wire lead within said slot.

6. Apparatus as defined in claim 1 wherein each said wire shearing surface is formed by a notch within the outer end of the corresponding said sleeve, and wherein said means for effecting relative movement of said sleeves is effective to rotate said outer sleeve on said inner sleeve.

7. Apparatus as defined in claim 6 wherein said outer sleeve is supported for both axial and rotary movement on said inner sleeve, and including means for limiting the axial and rotary movement of said outer sleeve on said inner sleeve.

8. In apparatus for winding coils of wire on an armature core mounted on a shaft supporting a commutator having hook-like tangs to which armature wire leads are attached to the commutator, the combination of an inner sleeve surrounding the commutator to shield the tangs, an outer sleeve mounted on said inner sleeve for both rotary and axial movement, a first wire shearing surface on said inner sleeve, a second wire shearing surface on said outer sleeve, means for producing relative axial movement between said inner and outer sleeves to expose selectively the tangs for attaching the wire leads, and means for producing relative rotation between said inner and outer sleeves to effect shearing of a wire lead extending from a commutator tang between said shearing surfaces for minimizing the length of the wire lead projecting from the tang.

9. In apparatus for winding coils of wire on an armature core mounted on a shaft supporting a commutator having hook-like tangs to which armature wire leads are attached to the commutator, the combination of an inner sleeve surrounding the commutator to shield the tangs, an outer sleeve surrounding said inner sleeve, a first set of wire shearing surfaces on said inner sleeve, a second set of corresponding wire shearing surfaces on said outer sleeve, a set of wire gripping members positioned outwardly of said outer sleeve and having power actuated means for releasably gripping corresponding wires, means for moving said gripping members generally radially relative to said sleeves, means for moving said gripping members axially relative to said sleeves, means for moving said sleeves to a position where wire leads extend from corresponding tangs between corresponding pairs of cooperating shearing surfaces, each of said corresponding pairs consisting of one shearing surface from each of said first and second sets of shearing surfaces, and means for moving said sleeves to a position effective to shear the wire leads between said corresponding pairs of shearing surfaces.

10. Apparatus as defined in claim 9 wherein said means for moving said sleeves comprise an actuating mechanism for rotating said outer sleeve on said inner sleeve.

11. Apparatus as defined in claim 10 wherein said mechanism comprises an annular actuating member concentrically surrounding said sleeves, an annular gear connected to said actuating member, a rack engaging said gear, and fluid cylinder means connected to move said rack to effect rotation of said actuating member and said outer sleeve.

12. Apparatus as defined in claim 10 wherein said outer sleeve releasably engages said mechanism to provide for retracting said sleeves axially relative to said mechanism.

13. In a method of winding coils of wire on an armature core mounted on a shaft and including the step of connecting wire leads extending from the coils to corresponding segments of a commutator also mounted on the shaft, the improved steps of locating said commutator within a set of concentric inner and outer sleeves having complementary generally axially extending wire shearing surfaces, positioning a wire lead extending from said commutator between said shearing surfaces, and producing relative rotative movement between said sleeves to effect shearing of the wire lead adjacent said commutator.

14. A method as defined in claim 13 wherein said step of producing relative movement between said sleeves, comprises rotating said outer sleeve on said inner sleeve.

15. A method as defined in claim 13, including the step of gripping the wire lead extending from said commutator before the wire lead is severed, and pulling said wire lead outwardly from said commutator during the cutting operation.

* * * * *